(12) United States Patent
Stone et al.

(10) Patent No.: US 11,939,877 B1
(45) Date of Patent: Mar. 26, 2024

(54) METHOD AND INTEGRALLY BLADED ROTOR FOR BLADE OFF TESTING

(71) Applicant: Pratt & Whitney Canada Corp., Longueuil (CA)

(72) Inventors: Paul Stone, Guelph (CA); Dikran Mangardich, Richmond Hill (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/971,211

(22) Filed: Oct. 21, 2022

(51) Int. Cl.
*F01D 21/00* (2006.01)

(52) U.S. Cl.
CPC ........ *F01D 21/003* (2013.01); *F05D 2220/32* (2013.01); *F05D 2260/83* (2013.01)

(58) Field of Classification Search
CPC . F01D 21/003; F05D 2220/32; F05D 2260/83
See application file for complete search history.

(56) References Cited

U.S. PATENT DOCUMENTS

| | | | |
|---|---|---|---|
| 3,097,824 A | 7/1963 | Bunger | |
| 3,817,657 A | 6/1974 | Hueber | |
| 5,314,307 A * | 5/1994 | Farmer | ................. F01D 5/3007 416/61 |
| 6,146,099 A | 11/2000 | Zipps | |
| 8,864,465 B2 | 10/2014 | Viegas | |
| 9,804,128 B2 * | 10/2017 | Yamamoto | ........... G01N 29/225 |
| 10,113,442 B2 | 10/2018 | Hall | |
| 10,260,512 B2 | 4/2019 | Hall | |
| 10,774,679 B2 | 9/2020 | Cotten | |
| 2010/0158693 A1 * | 6/2010 | Viegas | ................... F01D 5/3007 416/223 R |
| 2012/0027605 A1 * | 2/2012 | Cordier | ................... F01D 5/282 416/220 R |
| 2015/0330246 A1 * | 11/2015 | Whitehead | ............ F01D 5/3007 29/889.6 |
| 2016/0341205 A1 * | 11/2016 | Gillant | .................. F04D 29/325 |

(Continued)

FOREIGN PATENT DOCUMENTS

| | | |
|---|---|---|
| CN | 103808515 B | 8/2016 |
| CN | 107202681 B | 4/2020 |
| CN | 110030042 B | 9/2021 |

OTHER PUBLICATIONS

EP search report for EP23205364.5 dated Jan. 3, 2024.

*Primary Examiner* — David E Sosnowski
*Assistant Examiner* — Theodore C Ribadeneyra
(74) *Attorney, Agent, or Firm* — Getz Balich LLC

(57) ABSTRACT

An integrally bladed rotor (IBR) for a gas turbine engine and method is provided. The IBR is configured for use in blade off testing and includes a hub, a plurality of rotor blades, a central passage, and first and second lateral cavities. The hub has forward and aft ends and a circumferentially extending exterior surface. The central passage is disposed in the hub radially below a test rotor blade, extending along a path between an inlet at or forward of the test blade leading edge and an outlet at or aft of the test blade trailing edge. The first and second lateral cavities are disposed in the hub, extending generally parallel to the central passage path, on opposite circumferential sides. The first lateral cavity is disposed a distance (MSD1) from the central passage and the second lateral cavity is disposed a distance (MSD2) from the central passage.

20 Claims, 4 Drawing Sheets

(56) References Cited

U.S. PATENT DOCUMENTS

2018/0016934 A1\* 1/2018 Hall ................... F01D 21/045
2018/0017065 A1\* 1/2018 Hall ................... F01D 21/045
2020/0123910 A1   4/2020 Cotten \* cited by examiner

METHOD AND INTEGRALLY BLADED ROTOR FOR BLADE OFF TESTING

BACKGROUND OF THE INVENTION

1. Technical Field

The present disclosure relates gas turbine engine integrally bladed rotors in general and to integrally bladed rotors modifying for certification testing in particular.

2. Background Information

Blade off testing is a specific form of air safety testing required by various regulatory entities such as the Federal Aviation Administration (FAA), the European Union Aviation Safety Agency (EASA), Transport Canada, and the like. Blade off testing is used as part of the gas turbine engine safety performance certification. Blade off testing includes a deliberate liberation of a rotor blade while the engine is under power so that the consequences of the liberated blade ("blade off") can be determined. More specifically, blade off tests are used to ensure that an engine can survive a rotor blade (e.g., a fan blade, or a compressor blade, or a turbine blade) breaking off within the engine without fragments being thrown through the outside enclosure of the engine, creating an uncontained engine failure. The specific requirements of the blade off testing can vary between regulatory entities. For example, some regulatory entities currently specify that a blade test must include liberation of most of a blade (e.g., at least 80%), but do not require all of the blade to be liberated. Other regulatory entities specify that all of the blade extending out from the hub must be liberated. Moreover, specific regulatory entities may from time to time change their own requirements.

Blade off testing is well known. There are several different known techniques for liberating a rotor blade, such as an explosive liberation, or thermal degradation of adhesive disposed in slots cut in a rotor blade, and the like. A key aspect of blade testing is liberating a rotor blade at a predetermined position on the blade under predetermined conditions.

What is needed is a method and IBR configured for blade off testing that is consistent and one that produces accurate results.

SUMMARY

According to an aspect of the present disclosure, an integrally bladed rotor for a gas turbine engine is provided. The integrally bladed rotor is configured for use in blade off testing and includes a hub, a plurality of rotor blades, a central passage, a first lateral cavity, and a second lateral cavity. The hub has a forward end, an aft end, a circumferentially extending exterior surface disposed between the forward end and the aft end. The plurality of rotor blades are integrally attached to the hub and circumferentially spaced around the hub. The plurality of rotor blades includes a test blade. Each rotor blade extends radially out from the hub exterior surface, and each rotor blade has a leading edge disposed proximate the forward end of the hub, and a trailing edge disposed proximate the aft end of the hub. The central passage is disposed in the hub radially below the test rotor blade. The central passage extends along a continuous path between a passage inlet at or forward of the leading edge of the test blade and a passage outlet at or aft of the trailing edge of the test blade. The first lateral cavity is disposed in the hub and extends generally parallel to the central passage path. The first lateral cavity is disposed on a first circumferential side of the test blade and disposed a first minimal separation distance (MSD1) from the central passage. The second lateral cavity is disposed in the hub and extends generally parallel to the central passage path. The second lateral cavity is disposed on a second circumferential side of the test blade, opposite the first circumferential side, and is disposed a second minimal separation distance (MSD2) from the central passage.

In any of the aspects or embodiments described above and herein, the integrally bladed rotor may include a mechanism for facilitating liberation of the test blade, wherein the mechanism is disposed in the central passage.

In any of the aspects or embodiments described above and herein, the integrally bladed rotor may comprise a material having one or more mechanical strength properties, and the mechanism for facilitating liberation of the test blade may include a heating element selectively operable to produce an amount of thermal energy sufficient to heat the integrally bladed rotor material proximate the central passage from a first temperature to a second temperature and at the second temperature the one or more mechanical strength properties of the integrally bladed rotor material proximate the central passage are decreased to a point where the integrally bladed rotor material proximate the central passage will fail during a blade off test.

In any of the aspects or embodiments described above and herein, the mechanism for facilitating liberation of the test blade may include an explosive material.

In any of the aspects or embodiments described above and herein, the first minimal separation distance (MSD1) and the second minimal separation distance (MSD2) may be substantially equal.

In any of the aspects or embodiments described above and herein, the first minimal separation distance (MSD1) and the second minimal separation distance (MSD2) may be substantially equal along the path between the passage inlet and the passage outlet.

In any of the aspects or embodiments described above and herein, the central passage may be disposed a third minimal separation distance (MSD3) from the hub exterior surface on the first circumferential side of the test blade, and the third minimal separation distance (MSD3) may be greater than the first minimal separation distance (MSD1), and the central passage may be disposed a fourth minimal separation distance (MSD4) from the hub exterior surface on the second circumferential side of the test blade, and the fourth minimal separation distance (MSD4) may be greater than the second minimal separation distance (MSD2).

In any of the aspects or embodiments described above and herein, at least one of the first lateral cavity or the second lateral cavity may be configured as an open channel, open to the hub exterior surface.

In any of the aspects or embodiments described above and herein, at least one of the first lateral cavity or the second lateral cavity may be configured as a closed passage that does not intersect with the hub exterior surface.

In any of the aspects or embodiments described above and herein, at least a portion of the central passage may be disposed in the hub radially inward of a line extending between the hub exterior surface on the first circumferential side to the hub exterior surface on the second circumferential side, the line following a contour of the hub exterior surface.

In any of the aspects or embodiments described above and herein, all of the central passage may be disposed in the hub radially inward of the line.

In any of the aspects or embodiments described above and herein, the integrally bladed rotor may be configured for use in a compressor section of the gas turbine engine or for use in a fan section of the gas turbine engine.

According to another aspect of the present disclosure, a method for performing blade off testing on an integrally bladed rotor for a gas turbine engine is provided. The method includes: a) providing an integrally bladed rotor that has a hub, a plurality of rotor blades, a central passage, a first lateral cavity, and a second lateral cavity, wherein the hub has a forward end, an aft end, and a circumferentially extending exterior surface disposed between the forward end and the aft end, and wherein the plurality of rotor blades are integrally attached to the hub and circumferentially spaced around the hub, and the plurality of rotor blades includes a test blade, and each rotor blade extends radially out from the hub exterior surface, and each rotor blade has a leading edge disposed proximate the forward end of the hub and a trailing edge disposed proximate the aft end of the hub, and wherein the central passage is disposed in the hub radially below the test rotor blade, and the central passage extends along a continuous path between a passage inlet at or forward of the leading edge of the test blade and a passage outlet at or aft of the trailing edge of the test blade, and wherein the first lateral cavity is disposed in the hub extending generally parallel to the central passage path, and the first lateral cavity is disposed on a first circumferential side of the test blade and disposed a first minimal separation distance (MSD1) from the central passage, and the second lateral cavity is disposed in the hub extending generally parallel to the central passage path, the second lateral cavity is disposed on a second circumferential side of the test blade that is opposite the first circumferential side, and is disposed a second minimal separation distance (MSD2) from the central passage; b) disposing a mechanism for facilitating liberation of the test blade in the central passage of the test blade; c) operating the gas turbine engine to test operating conditions; and d) actuating the mechanism for facilitating liberation of the test blade to cause the test blade to be liberated from the integrally bladed rotor during the test operation conditions.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

The present disclosure is directed to an integrally bladed rotor (IBR) configured for performing rotor blade "blade-off" testing for certification purposes, and to a method for performing rotor blade "blade-off" testing for certification purposes.

Figure 1:
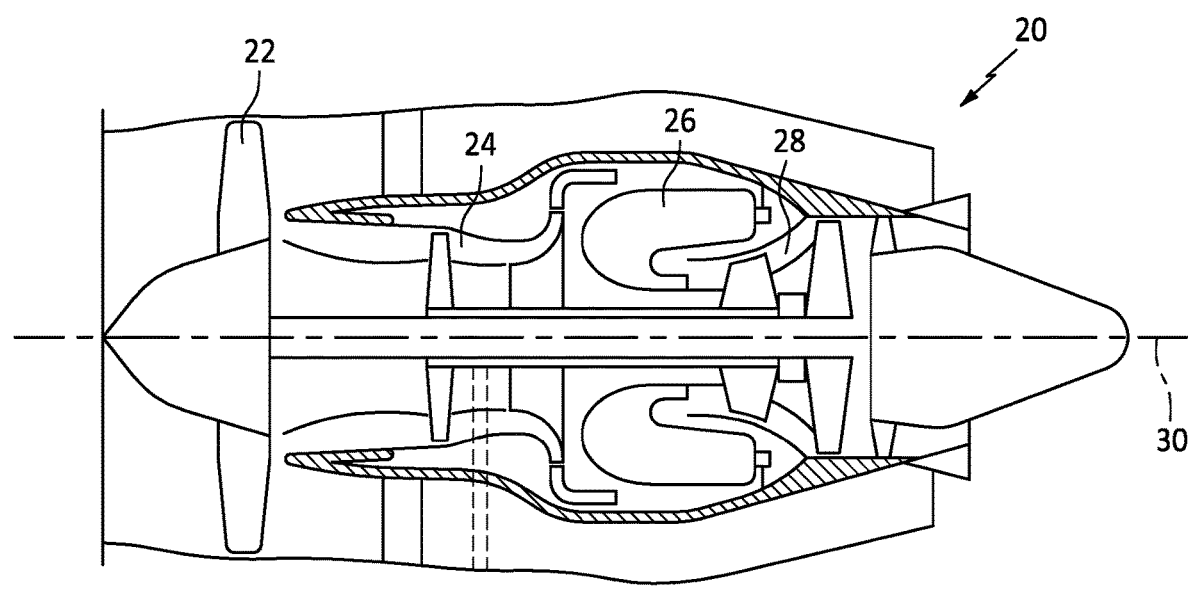
FIG. 1 is a diagrammatic sectional view of a gas turbine engine.

FIG. 1 illustrates a gas turbine engine 20 of a type preferably provided for use in subsonic flight, generally comprising in serial flow communication a fan 22 through which ambient air is propelled, a compressor section 24 for pressurizing the air, a combustor 26 in which the compressed air is mixed with fuel and ignited for generating an annular stream of hot combustion gases, and a turbine section 29 for extracting energy from the combustion gases. The gas turbine engine example shown in FIG. 1 is a two-spool turbofan rotational about a rotational axis 30. The present disclosure is not limited to blade testing with any particular gas turbine engine 20 configuration.

A gas turbine engine 20 includes a number of different rotor stages; e.g., one or more fan blade rotor stages, compressor rotor blade stages, and turbine rotor blade stages. Each rotor stage is configured for rotational movement in the gas turbine engine 20. Fan and compressor rotor stages are configured to be driven via a shaft or a gear arrangement and turbine stages are configured to be driven by a core gas flow passing (e.g., axially) within the engine.

Figure 2:
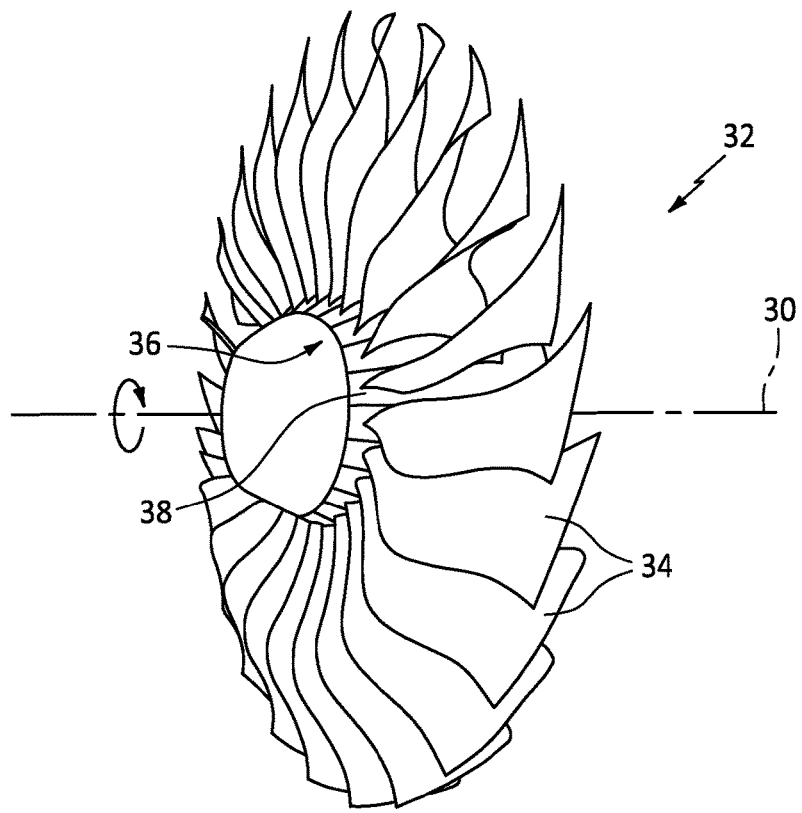
FIG. 2 is a diagrammatic perspective view of an integrally bladed rotor.

Each rotor stage includes a plurality of rotor blades extending out (generally in a radial direction) from a hub. The rotor blades are spaced apart from one another around the circumference of the hub, typically uniform spaced. It should also be noted that the terms "radial" and "circumferential" are used herein with respect to the rotational axis 30 of the gas turbine engine 20. In some embodiments, a rotor blade may be mechanically attached to the hub. Various mechanical attachment configurations are known; e.g., the rotor blade may have a root configured to be received in a corresponding slot disposed within the hub. In these embodiments, a rotor blade is attached to the hub, but is not integral with the hub. The rotor blade may be selectively removed from the hub for replacement, maintenance, and the like. In some embodiments, rotor blades may be permanently attached to the hub and may be integral with the hub. Rotor stages of this type are often referred to as "integrally bladed rotors" or "IBRs" or "blisks" (hereinafter referred to as an "IBR 32"). An IBR 32 (e.g., see FIG. 2) may be formed by permanently attaching the rotor blades 34 to the hub 36 (e.g., by weldment or other attachment process), or the entirety of the IBR 32 may be machined from a unitary material. In an IBR 32, the hub 36 extends circumferentially between adjacent rotor blades 34. The exterior surface 38 of the IBR hub 36 between adjacent rotor blades 34 defines (at least in part) an inner gas path surface for the rotor stage.

Referring to FIGS. 3-6, a rotor blade 34 typically has an airfoil shaped body 40 having a suction side surface 42, a pressure side surface 44, a leading edge 46, a trailing edge 48, a base end 50, and a blade tip 52. The airfoil shaped body 40 may be described as having a chord length extending between the leading edge 46 and the trailing edge 48, and a span extending between the base end 50 and the blade tip 52. The chord is a straight line that extends between the leading edge 46 and the trailing edge 48. The airfoil 40 may also be described as having a camber line that extends between the leading edge 46 and the trailing edge 48, and intersects the chord at the leading edge 46 and the trailing edge 48. The camber line is disposed equidistant between the suction side surface 42 and the pressure side surface 44. The terms "forward" and "aft" as used herein refer to axial orientation. For example, the leading edge 46 of a rotor blade 34 encounters air/core gas passing through a gas turbine engine 20 before the same air/core gas encounters the trailing edge 48 of the same rotor blade 34. When disposed within an engine 20, the leading edge 46 of a rotor blade 34 may be described as being "forward" of the trailing edge 48, and conversely the trailing edge 48 of a rotor blade 34 may be described as being "aft" of the leading edge 46. In similar fashion, the IBR hub 36 may be described as having a forward end 54 proximate the leading edges 46 of the rotor blades 34 and an aft end 56 proximate the trailing edges 48 of the rotor blades 34.

Figure 3:
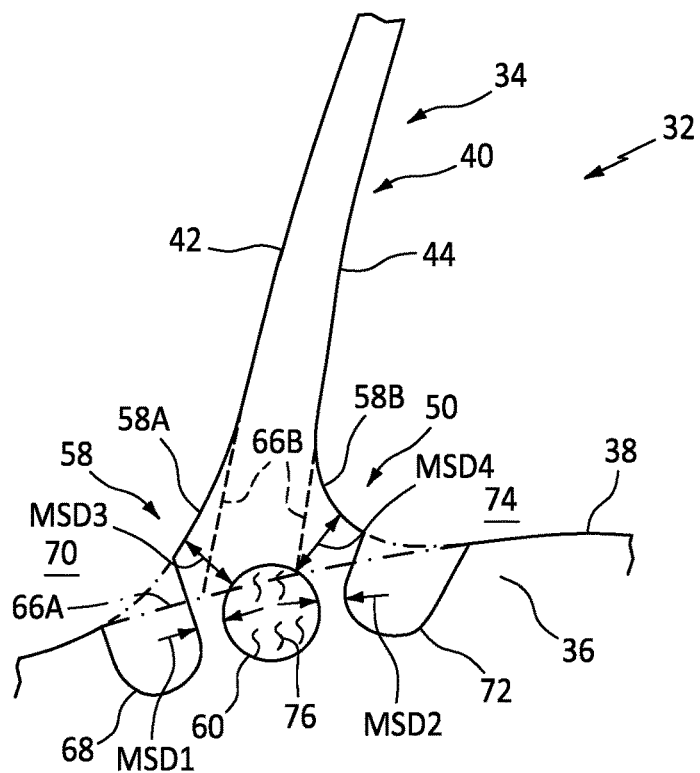
FIG. 3 is a diagrammatic partial end view of an integrally bladed rotor showing a rotor blade extending out from a hub and an embodiment of the present disclosure.

In some embodiments, a rotor blade 34 may have a solid configuration throughout its entirety; i.e., continuous material between the suction side surface 42 and the pressure side surface 44, with no internal voids. Fan rotor blades and compressor rotor blades may have a solid configuration. In some embodiments, a portion of a rotor blade 34 may have a solid configuration and may have a portion that has internal voids. For example, a fan rotor blade may have a portion with a solid configuration (e.g., proximate the base region of the fan blade) and a portion that includes one or more internal voids (e.g., in the airfoil above the base region) to decrease the weight of the fan blade. Compressor blades often have an entirely solid configuration. As indicated above, rotor blades that are mechanically attached to a hub typically have a root portion and may include a platform portion that extends laterally outward to collectively form an inner gas path structure. Rotor blades 34 in an IBR 32 do not include a root section. Rather, an IBR rotor blade 34 typically transitions from a filleted region 58 into the airfoil portion 40 of the rotor blade 34. The filleted region 58 typically include a suction side fillet 58A disposed on the suction side of the airfoil 40, a pressure side fillet 58B disposed on the pressure side of the airfoil 40, a leading edge fillet 58C disposed at the leading edge 46 of the airfoil 40, and a trailing edge fillet 58D disposed at the trailing edge 48 of the airfoil 40. The respective fillets 58A-D are solid and increase the thickness of the rotor blade 34 proximate the intersection of the airfoil 40 and the hub 36. The respective fillets 50A-D may be configured to increase the mechanical strength of the rotor blade 34 at the intersection of the airfoil 40 and the hub 36, eliminate or reduce stress concentrations that may be present at the intersection of the airfoil 40 and the hub 36 absent the fillets 50A-D, and to produce desirable air flow surfaces. The diagrammatic partial view shown in FIG. 3 illustrates a suction side fillet 50A and a pressure side fillet 50B. The region of the airfoil 40 extending to the hub 36 and contiguous with the filleted region 58 may also have a solid configuration. A respective fillet defines a transitional surface between a rotor blade airfoil 40 and the exterior surface 38 of the hub 36 that in part defines an inner gas path surface for the IBR 32.

Figure 4:
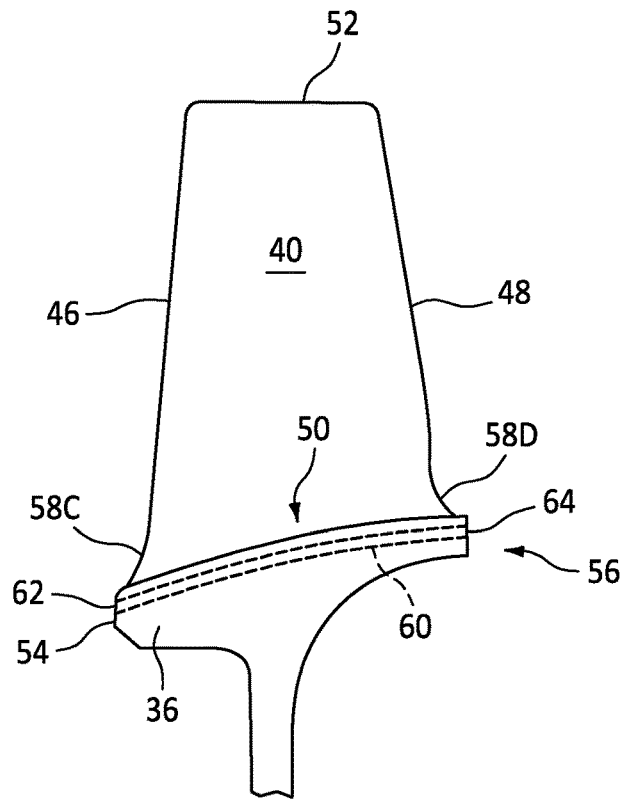
FIG. 4 is a diagrammatic partial side view of an integrally bladed rotor showing a rotor blade extending out from a hub and an embodiment of the present disclosure.

In the embodiments diagrammatically shown in FIGS. 3 and 4, the present disclosure includes a generally axially extending central passage 60 disposed in the hub 36 of the IBR 32 substantially aligned with the leading edge 46 and the trailing edge 48. The central passage 60 has an inlet 62 disposed at one end of the passage 60 and an outlet 64 disposed at the opposite end of the passage 60. The term "generally axially extending" as used herein does not require the central passage 60 to be parallel to the rotational axis 30 of the IBR 32. In some embodiments, a rotor blade 34 may be oriented both axially and circumferentially. The trailing edge 48 of the rotor blade airfoil 40 is disposed axially aft of the leading edge 46 of the rotor blade airfoil 40, but the chord of the rotor blade airfoil 40 proximate the hub 36 may be canted at an angle to the rotational axis 30 of the IBR 32 (i.e., the leading edge 46 and the trailing edge 48 are not circumferentially aligned); hence, the orientation of the rotor blade airfoil 40 proximate the hub 36 may have an axial component and a circumferential component. Typically, proximate the hub 36 the axial component is substantially greater than the circumference component. The central passage 60 is disposed in the hub 36 proximate the intersection of the rotor blade airfoil 40 and the hub 36. As stated above, the central passage 60 is disposed in the hub 36 of the IBR 32 and is substantially aligned with the leading edge 46 and the trailing edge 48 of the rotor blade airfoil 40. The central passage 60 may extend within the hub 36 in a straight line configuration (e.g., along a line similar to a chord of the rotor blade airfoil 40), or may extend in an arcuate line configuration (e.g., along a line similar to the camber line the rotor blade airfoil 40), or may extend along a first straight line portion extending from the forward end 54 of the IBR 32 toward the aft end 56 of the IBR 32 and extend along a second straight line portion extending from the aft end 56 of the IBR 32 toward the forward end 54 of the IBR 32, wherein the first and second straight line portions intersect one another to form the continuous central passage 60 within the hub 36, or the like. The present disclosure is not limited to a central passage 60 geometry other than extending continuously through the hub 36 generally aligned with the rotor blade 34 between the leading edge 46 and the trailing edge 48 of the rotor blade airfoil 40. As will be explained below, the central passage 60 is configured to receive an exothermic material.

Figure 5:
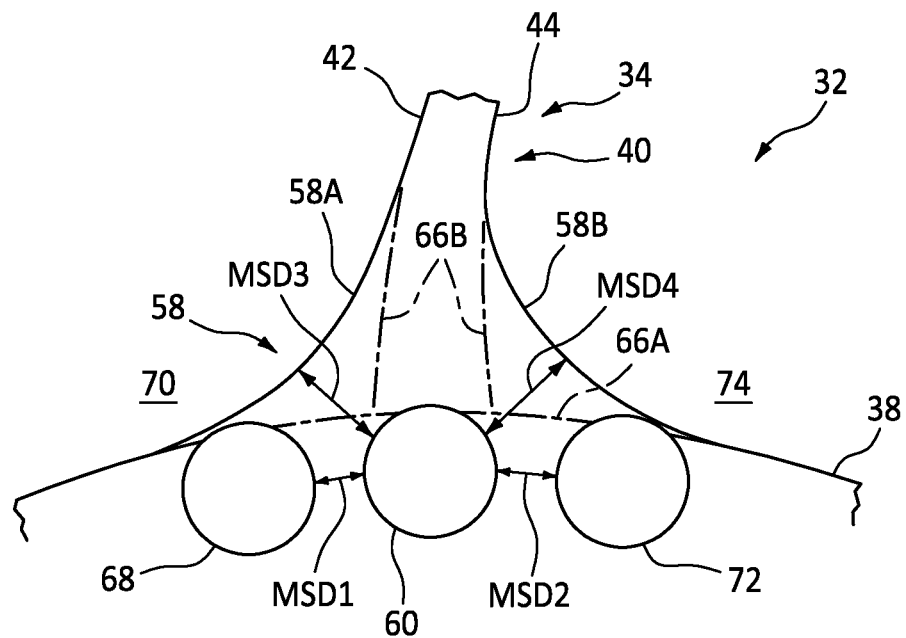
FIG. 5 is a diagrammatic partial end view of an integrally bladed rotor showing a rotor blade extending out from a hub and an embodiment of the present disclosure.
Figure 6:
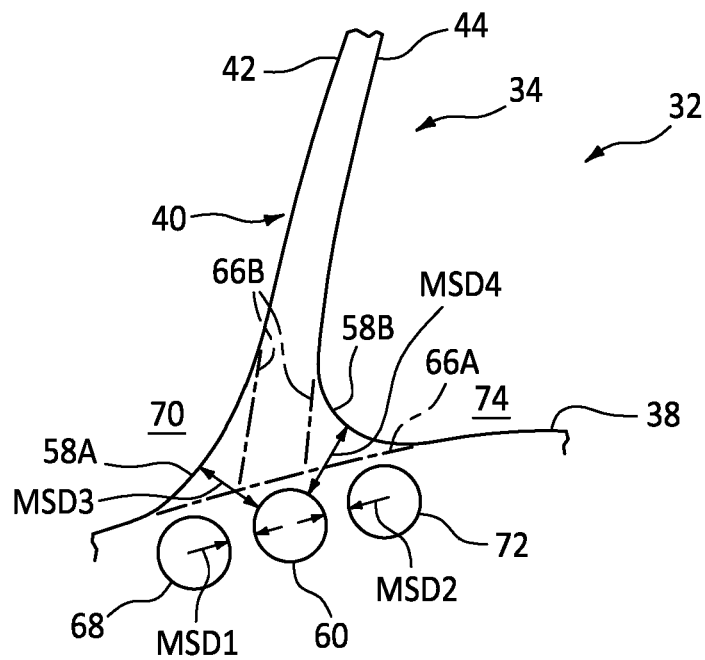
FIG. 6 is a diagrammatic partial end view of an integrally bladed rotor showing a rotor blade extending out from a hub and an embodiment of the present disclosure.

The central passage 60 is disposed within the hub 36 at a radial position (relative to the rotor stage rotational axis 30) associated with a desired fracture plane. More specifically, the central passage 60 is disposed proximate the intersection of the blade airfoil 40 and a line representing a continuation of the exterior surface 38 of the hub 36 that in part defines the inner gas path surface for the rotor stage. FIGS. 3, 5, and 6 illustrate the intersection of the blade airfoil 40 and the line representing the continuation of the exterior surface 38 of the hub 36 is shown in phantom lines. Phantom lines 66A, 66B illustrate where the exterior surface 38 of the hub 36 and the rotor blade airfoil 40 may intersect but for the fillets 58. The specific radial position of the central passage 60 may vary depending on the application; e.g., to achieve the desired fracture plane. In the FIG. 3, a portion of the central passage 60 is shown slightly above the line 66A representing the exterior surface 38 of the hub 36. In the FIG. 5, the line 66A representing the exterior surface of the hub 36 is substantially tangential to the central passage 60. In the FIG. 6, the entirety of the central passage 60 is shown radially below the line 66A representing the exterior surface 38 of the hub 36. These central passage 60 radial positions are non-limiting examples of where the central passage 60 may be located radially.

Different IBRs 32 may have different configurations; e.g., some may have an extended hub exterior surface 38 forward of the rotor blades 34 and/or an extended hub exterior surface 38 forward of the rotor blades 40, some may have a hub exterior surface 38 that extends axially at a relatively constant radial position, others may have a hub exterior surface 38 that extends axially at a steep radial angle, etc. The central passage 60 extends continuously in the hub 36 between the central passage inlet 62 disposed at or forward of the leading edge 46 of the rotor blade 40 and the central passage outlet 64 disposed at or aft of the trailing edge 48 of the rotor blade 40. The specific positions of the central passage inlet 62 and outlet 64 may, however, vary depending on the IBR 32 configuration; e.g., disposed in the hub exterior surface 38, or a forward or aft surface of the hub 36, or the like, or any combination thereof. The present disclosure is not limited to any particular central passage 60 configuration (including the inlet 62 and outlet 64 positions); e.g., the configurations described herein and variations thereof.

The central passage 60 is shown in FIGS. 3, 5, and 6 as having a circular geometry. The present disclosure is not limited to a central passage 60 having a circular geometry; e.g., the central passage 60 may have another geometry such as an oval, or a slot, or the like.

The present disclosure further includes a first lateral cavity 68 disposed in the hub 36 on a first circumferential side 70 of the central passage 60 and second lateral cavity 72 disposed in the hub 36 on a second circumferential side 74 of the central passage 60 opposite the first lateral cavity 68. The first and second lateral cavities 68, 72 extend generally parallel to the central passage 60; e.g., between the forward end 54 of the IBR 32/hub 36 and the aft end 56 of the IBR 32/hub 36. The first lateral cavity 68 is disposed within the hub 36 to create a first minimal separation distance (MSD1) between the first lateral cavity 68 and the central passage 60. The first minimal separation distance (MSD1) extends through a solid portion of the hub 36 between the first lateral cavity 68 and the central passage 60. The first minimal separation distance (MSD1) between the first lateral cavity 68 and the central passage 60 is preferably substantially uniform over the axial length of the central passage 60, but is not required to be substantially uniform. The second lateral cavity 72 is disposed within the hub 36 to create a second minimal separation distance (MSD2) between the second lateral cavity 72 and the central passage 60. The second minimal separation distance (MSD2) extends through a solid portion of the hub 36 between the second lateral cavity 72 and the central passage 60. The second minimal separation distance (MSD2) between the second lateral cavity 72 and the central passage 60 is preferably substantially uniform over the axial length of the central passage 60, but is not required to be substantially uniform.

As can be seen in FIG. 3, the central passage 60 is also disposed a third minimal separation distance (MSD3) between the central passage 60 and an exterior surface (e.g., fillet 58A) on the first circumferential side 70 that defines a portion of the inner gas path surface of the IBR 32. The third minimal separation distance (MSD3) extends through a solid portion of the hub 36. The third minimal separation distance (MSD3) is greater than the first minimal separation distance (MSD1). As can be also seen in FIG. 3, the central passage 60 is also disposed a fourth minimal separation distance (MSD4) between the central passage 60 and an exterior surface (e.g., fillet 58B) disposed on the second circumferential side 74 that defines a portion of the inner gas path surface of the IBR 32. The fourth minimal separation distance (MSD4) extends through a solid portion of the hub 36. The fourth minimal separation distance (MSD4) is greater than the third minimal separation distance (MSD2).

Figure 7:
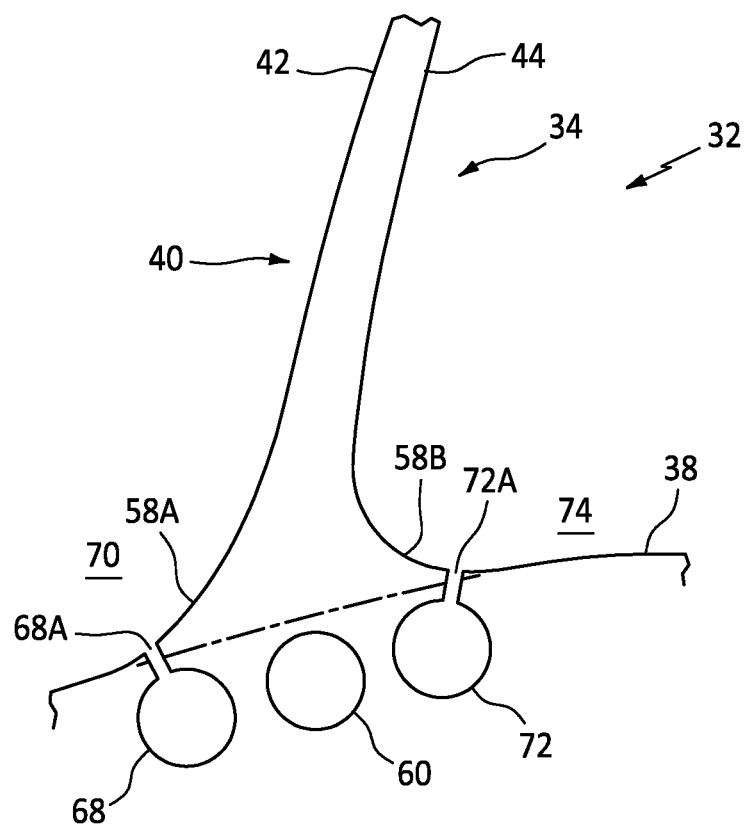
FIG. 7 is a diagrammatic partial end view of an integrally bladed rotor showing a rotor blade extending out from a hub and an embodiment of the present disclosure.

The first and second lateral cavities 68, 72 may have a variety of different configurations. In the embodiment shown in FIG. 3, the first and second lateral cavities 68, 72 are configured as open channels, each with a respective opening to the exterior surface 38 of the IBR 32. In the embodiment shown in FIG. 3, the first and second lateral cavities 68, 72 are configured as open channels having a circular-shaped base surface and parallel side surfaces. The present disclosure is not limited to first and second lateral cavities 68, 72 having such an open channel configuration. In the embodiment shown in FIGS. 5 and 6, the first and second lateral cavities 68, 72 are configured as closed passages; e.g., passages that do not break through the exterior surface 38 of the IBR 32. In FIG. 7, the first and second lateral cavities 68, 72 are substantially closed, with slots 68A, 72A extending between the respective surfaces (58A, 58B) and lateral cavities 68, 72. The slots 68A, 72A break the hoop stress and thereby increase the radial stress during testing. In the embodiment shown in FIGS. 5 and 6, the first and second lateral cavities 68, 72 are configured as circular-shaped closed passages. The present disclosure is not limited to first and second lateral cavities 68, 72 having a circular-shaped closed passage configuration; e.g., the first and second lateral cavities 68, 72 may have a slot-shaped closed passage configuration, or the like. In the embodiments shown in FIGS. 3, 5, 6, and 7, the first and second lateral cavities 68, 72 are shown as having identical configurations. In alternative embodiments, the first lateral cavity 68 may have a configuration that differs from the second lateral cavity 72; e.g., the first and second lateral cavities 68, 72 may both be closed passages, but differently shaped, or the first and second lateral cavities 68, 72 may both be open channels, but differently shaped, or the first lateral cavity 68 may be an open channel and the second lateral cavity 72 may be a closed passage, or vice versa, etc.

In some embodiments, an IBR having a central passage 60 and first and second lateral cavities 68, 72 may include structure (e.g., similar holes, etc.) on the opposite side of the IBR (e.g., 180 degrees off set from the central passage 60 and first and second lateral cavities) for rotational balance purposes.

It should be noted that the first minimal separation distance (MSD1) between the first lateral cavity 68 and the central passage 60 may be substantially equal to the second minimal separation distance (MSD2) between the second lateral cavity 72 and the central passage 60, but that is not required. Depending on the IBR 32 configuration and/or the certification requirements, it may be desirable to have a first minimal separation distance (MSD1) that is different in magnitude than the second minimal separation distance (MSD2).

It should be noted that the third minimal separation distance (MSD3) between the central passage 60 and an exterior surface (e.g., fillet 58A) on the first circumferential side 70 may be substantially equal to the fourth minimal separation distance (MSD4) between the central passage 60 and an exterior surface (e.g., fillet 58B) disposed on the second circumferential side 74, but that is not required. Depending on the IBR 32 configuration and/or the certification requirements, it may be desirable to have a third minimal separation distance (MSD3) that is different in magnitude than the fourth minimal separation distance (MSD4).

Embodiments of the present disclosure may include a mechanism 76 that can be operated to facilitate liberation of the test blade. The mechanism 76 is configured to be disposed within the central passage 60 disposed below the blade 34 to be liberated (i.e., the "test blade 34") during the certification test. A variety of different mechanism 76 types may be used.

In some embodiments, for example, a mechanism 76 may be configured as a heating element. Upon activation, the heating element produces sufficient thermal energy to increase the temperature of the IBR 32 material proximate the central passage 60 to a level wherein the mechanical properties (e.g., tensile strength) of the IBR 32 material are compromised and the rotor blade 34 will liberate during operation. An example of a heating element type is an electrically powered device such as a heating rod or an induction heater. Another example of an acceptable heating element type is a material that can be activated to produce an exothermic non-explosive reaction, such as a magnesium and barium peroxide thermite material. The performance characteristics of the heating element may vary depending on the application. For example, an IBR 32 having "thicker" first and second minimal separation distances (MSD1, MSD2), may require a heating element that produces a greater amount of thermal energy. As another example, the type of IBR 32 material in the region of the central passage 60 may influence the selection of the heating element; e.g., different materials have different material properties as a function of temperature and the heating element may be chosen in view of the IBR material. The IBR 32 is not limited to comprising any particular type of material. The present disclosure is not limited to any particular mechanism for actuating the heating element. For example, a slip ring or other electrically conductive mechanism may be used to provide electrical current/signal to the heating element.

Another example of a mechanism 76 that can be used to facilitate liberation of the test blade 34 is an explosive material that upon activation produces sufficient energy to cause the IBR 32 material proximate the central passage 60 to fail and thereby liberate the rotor blade 34. The present disclosure is not limited to any particular type of explosive material or form of explosive material.

In preferred embodiments, the region of the IBR 32 containing the central passage 60 (and lateral cavities 68, 72 where applicable) has a uniformly configured geometry in a direction between leading edge 46 and the trailing edge 48 so that the mechanical strength of the IBR material retaining the test blade 34 is uniform. The aforesaid uniform configuration is understood to result in a desirable uniform plane of liberation during the certification test.

It should be noted that the configuration and positioning of the central passage 60 and the first and second lateral cavities 68, 72 described above in the embodiments that utilize a liberation facilitating mechanism 76 are designed such that the IBR 32 can be run at rotational speeds and loadings within the gas turbine engine 20 without failing for certification testing purposes (absent the activation of the mechanism 76). In an alternative embodiment, the central passage 60 and the first and second lateral cavities 68, 72 may be configured so that testing can be performed without a liberation facilitating mechanism 76. For example, the central passage 60 and the first and second lateral cavities 68, 72 may be configured such that the test blade 34 will stay attached at particular rotor rotational velocities that may be prescribed for a test. In these embodiments, the test blade 34 may be liberated by increasing the rotor rotational velocity to a point where the centrifugal forces cause the material retaining the test blade 34 to fail; e.g., tensile overload.

The configuration of the central passage 60 and the lateral cavities 68, 72, including their specific geometric configurations, their relative spacings, and their radial positioning are typically chosen so that the IBR material disposed at the first minimal separation distance (MSD1) and the IBR material disposed at the second minimal separation distance (MSD2) are predominantly what retain the test blade 34. In those embodiments that include lateral cavities 68, 72 configured as open channels, once the IBR material between the central passage 60 and the open channels (i.e., the material at MSD1 and MSD2) fails, the rotor blade 34 will be liberated. In those embodiments that include closed lateral cavities 68, 72, once the IBR material (i.e., the material at MSD1 and MSD2) fails, whatever IBR material exists between the closed lateral cavities 68, 72 and the exterior surface will be insufficient to prevent the rotor blade 34 from liberating. In those embodiments that include a liberation facilitating mechanism 76, the material failure may be facilitated by thermally compromising the mechanical strength of the IBR material or by explosively fracturing it. As stated above, the IBR material between the central passage 60 and the lateral cavities 68, 72 (i.e., the material at MSD1 and MSD2) is less than the IBR material between the central passage 60 and the exterior surfaces 38 (i.e., the material at MSD3 and MSD4). The lesser distance at MSD1 and MSD2 ensures that failure will occur at the IBR material located at MSD1 and MSD2.

The present disclosure provides numerous benefits relative to existing blade off systems and configuration. For example, the present disclosure central passage 60 and the lateral cavities 68, 72 extend the entirety of the rotor blade 34 from leading edge 46 to trailing edge 48. The central passage 60/lateral cavities 68, 72 configuration facilitate providing a uniform geometry to the IBR 32 material retaining the rotor blade 34 to be liberated from leading edge 46 to trailing edge 48. Prior art systems that include slots or other weakened regions for portions of the rotor blade are non-uniform, and are understood to present the possibility that some regions will fail before others, or the possibility that a rupture may stop as it progresses into a potentially thicker cross-sectional area, there again potentially leading to testing inconsistency.

As yet another example, many prior art methods and systems for liberating a rotor blade are configured to sever the rotor blade in the airfoil portion of the rotor blade. Inherently, therefore, these prior art methods and systems are operable to liberate only a portion of the rotor blade and leave a remaining portion of the rotor blade proximate the hub 36. As indicated herein, various regulatory entities impose blade off testing as part of a gas turbine engine safety performance certification. The specific requirements of the regulatory entities often vary. For example, some regulatory entities may specify that at least a percentage of the rotor blade (e.g., at least 80%) of the blade must be liberated to satisfy the test requirements. Other regulatory entities may specify that all of the rotor blade (e.g., 100%) of the blade must be liberated to satisfy the test requirements. Hence, a blade off test configuration and system that liberates a rotor blade in the airfoil region may satisfy certification requirements, but not others. The present disclosure is configured to liberate most or substantially all of a rotor blade and thereby likely complies with more regional certification requirements and obviates the need for multiple different systems.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An integrally bladed rotor for a gas turbine engine, the integrally bladed rotor configured for use in blade off testing, comprising:
    a hub having a forward end, an aft end, a circumferentially extending exterior surface disposed between the forward end and the aft end;
    a plurality of rotor blades integrally attached to the hub and circumferentially spaced around the hub, the plurality of rotor blades including a test blade, each rotor blade of the plurality of rotor blades extending radially out from the hub exterior surface, and each rotor blade of the plurality of rotor blades having a leading edge disposed proximate the forward end of the hub, and each rotor blade of the plurality of rotor blades having a trailing edge disposed proximate the aft end of the hub;
    a central passage disposed in the hub radially below the test rotor blade, the central passage extending along a continuous path between a passage inlet at or forward of the leading edge of the test blade and a passage outlet at or aft of the trailing edge of the test blade;
    a first lateral cavity disposed in the hub extending generally parallel to the central passage path, the first lateral cavity disposed on a first circumferential side of the test blade and disposed a first minimal separation distance (MSD1) from the central passage; and
    a second lateral cavity disposed in the hub extending generally parallel to the central passage path, the second lateral cavity disposed on a second circumferential side of the test blade that is opposite the first circumferential side, and disposed a second minimal separation distance (MSD2) from the central passage.

2. The integrally bladed rotor of claim 1, further comprising a mechanism for facilitating liberation of the test blade, the mechanism disposed in the central passage.

3. The integrally bladed rotor of claim 2, wherein the integrally bladed rotor comprises a material having one or more mechanical strength properties; and
    wherein the mechanism for facilitating liberation of the test blade includes a heating element selectively operable to produce an amount of thermal energy sufficient to heat the integrally bladed rotor material proximate the central passage from a first temperature to a second temperature and at the second temperature the one or more mechanical strength properties of the integrally bladed rotor material proximate the central passage are decreased to a point where the integrally bladed rotor material proximate the central passage will fail during a blade off test.

4. The integrally bladed rotor of claim 2, wherein the mechanism for facilitating liberation of the test blade includes an explosive material.

5. The integrally bladed rotor of claim 1, wherein the first minimal separation distance (MSD1) and the second minimal separation distance (MSD2) are substantially equal.

6. The integrally bladed rotor of claim 5, wherein the first minimal separation distance (MSD1) and the second minimal separation distance (MSD2) are substantially equal along the path between the passage inlet and the passage outlet.

7. The integrally bladed rotor of claim 1, wherein the central passage is disposed a third minimal separation distance (MSD3) from the hub exterior surface on the first circumferential side of the test blade, and the third minimal separation distance (MSD3) is greater than the first minimal separation distance (MSD1); and wherein the central passage is disposed a fourth minimal separation distance (MSD4) from the hub exterior surface on the second circumferential side of the test blade, and the fourth minimal separation distance (MSD4) is greater than the second minimal separation distance (MSD2).

8. The integrally bladed rotor of claim 1, wherein at least one of the first lateral cavity or the second lateral cavity is configured as an open channel, open to the hub exterior surface.

9. The integrally bladed rotor of claim 1, wherein at least one of the first lateral cavity or the second lateral cavity is configured as a closed passage that does not intersect with the hub exterior surface.

10. The integrally bladed rotor of claim 1, wherein at least a portion of the central passage is disposed in the hub radially inward of a line extending between the hub exterior surface on the first circumferential side to the hub exterior surface on the second circumferential side, the line following a contour of the hub exterior surface.

11. The integrally bladed rotor of claim 10, wherein all of the central passage is disposed in the hub radially inward of the line.

12. The integrally bladed rotor of claim 1, wherein the integrally bladed rotor is configured for use in a compressor section of the gas turbine engine.

13. The integrally bladed rotor of claim 1, wherein the integrally bladed rotor is configured for use in a fan section of the gas turbine engine.

14. A method for performing blade off testing on an integrally bladed rotor for a gas turbine engine, comprising:
   providing an integrally bladed rotor having:
      a hub having a forward end, an aft end, and a circumferentially extending exterior surface disposed between the forward end and the aft end;
      a plurality of rotor blades integrally attached to the hub and circumferentially spaced around the hub, the plurality of rotor blades including a test blade, each rotor blade of the plurality of rotor blades extending radially out from the hub exterior surface, and each rotor blade of the plurality of rotor blades having a leading edge disposed proximate the forward end of the hub, and each rotor blade of the plurality of rotor blades having a trailing edge disposed proximate the aft end of the hub;
      a central passage disposed in the hub radially below the test rotor blade, the central passage extending along a continuous path between a passage inlet at or forward of the leading edge of the test blade and a passage outlet at or aft of the trailing edge of the test blade;
      a first lateral cavity disposed in the hub extending generally parallel to the central passage path, the first lateral cavity disposed on a first circumferential side of the test blade and disposed a first minimal separation distance (MSD1) from the central passage;
      a second lateral cavity disposed in the hub extending generally parallel to the central passage path, the second lateral cavity disposed on a second circumferential side of the test blade that is opposite the first circumferential side, and disposed a second minimal separation distance (MSD2) from the central passage;
   disposing a mechanism for facilitating liberation of the test blade in the central passage of the test blade;
   operating the gas turbine engine to test operating conditions; and
   actuating the mechanism for facilitating liberation of the test blade to cause the test blade to be liberated from the integrally bladed rotor during the test operation conditions.

15. The method of claim 14, wherein the integrally bladed rotor comprises a material having one or more mechanical strength properties; and
   wherein the mechanism for facilitating liberation of the test blade includes a heating element selectively operable to produce an amount of thermal energy sufficient to heat the integrally bladed rotor material proximate the central passage from a first temperature to a second temperature and at the second temperature the one or more mechanical strength properties of the integrally bladed rotor material proximate the central passage are decreased to a point where the integrally bladed rotor material proximate the central passage will fail during a blade off test.

16. W The method of claim 14, wherein the mechanism for facilitating liberation of the test blade includes an explosive material.

17. The method of claim 16, wherein the first minimal separation distance (MSD1) and the second minimal separation distance (MSD2) are each substantially uniform along the path that extends radially below the test rotor blade, between the passage inlet and the passage outlet.

18. The method of claim 17, wherein the central passage is disposed a third minimal separation distance (MSD3) from the hub exterior surface on the first circumferential side of the test blade, and the third minimal separation distance (MSD3) is greater than the first minimal separation distance (MSD1); and
   wherein the central passage is disposed a fourth minimal separation distance (MSD4) from the hub exterior surface on the second circumferential side of the test blade, and the fourth minimal separation distance (MSD4) is greater than the second minimal separation distance (MSD2).

19. The method of claim 14, wherein at least one of the first lateral cavity or the second lateral cavity is configured as an open channel, open to the hub exterior surface.

20. The method of claim 14, wherein at least one of the first lateral cavity or the second lateral cavity is configured as a closed passage that does not intersect with the hub exterior surface.

* * * * *